United States Patent
Kerzner et al.

(10) Patent No.: US 11,468,668 B2
(45) Date of Patent: *Oct. 11, 2022

(54) DRONE PRE-SURVEILLANCE

(71) Applicant: Alarm.com Incorporated, Tysons, VA (US)

(72) Inventors: Daniel Todd Kerzner, McLean, VA (US); Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,297

(22) Filed: Mar. 8, 2021

(65) Prior Publication Data
US 2021/0192177 A1 Jun. 24, 2021

Related U.S. Application Data

(63) Continuation of application No. 16/901,255, filed on Jun. 15, 2020, now Pat. No. 10,943,113, which is a
(Continued)

(51) Int. Cl.
*G06V 20/13* (2022.01)
*B64C 39/02* (2006.01)
(Continued)

(52) U.S. Cl.
CPC .............. *G06V 20/13* (2022.01); *B64C 39/02* (2013.01); *G06V 10/147* (2022.01); *G06V 20/52* (2022.01);
(Continued)

(58) Field of Classification Search
CPC .......... G06K 9/00; G06V 20/00; G08B 13/00; G08B 20/00; G08G 5/00; B64C 5/00
See application file for complete search history.

(56) References Cited

U.S. PATENT DOCUMENTS

2015/0005951 A1 1/2015 Srinivasan et al.
2015/0339912 A1* 11/2015 Farrand ................. G08B 25/10
340/501
(Continued)

FOREIGN PATENT DOCUMENTS

EP 2393058 12/2011

OTHER PUBLICATIONS

International Search Report and Written Opinion in International Application No. PCT/US2017/065909, dated Mar. 12, 2018, 15 pages.
(Continued)

*Primary Examiner* — Maryam A Nasri
(74) *Attorney, Agent, or Firm* — Fish & Richardson P.C.

(57) ABSTRACT

Methods, systems, and apparatus, including computer programs encoded on a storage device, for using a drone to pre-surveil a portion of a property. In one aspect, a system may include a monitoring unit. The monitoring unit may include a network interface, a processor, and a storage device that includes instructions to cause the processor to perform operations. The operations may include obtaining data that is indicative of one or more acts of an occupant of the property, applying the obtained data that is indicative of one or more acts of the occupant of the property to a pre-surveillance rule, determining that the pre-surveillance rule is satisfied, determining a drone navigation path that is associated with the pre-surveillance rule, transmitting, to a drone, an instruction to perform pre-surveillance of the portion of the one or more properties using the drone navigation path.

20 Claims, 8 Drawing Sheets

Related U.S. Application Data continuation of application No. 15/839,710, filed on Dec. 12, 2017, now Pat. No. 10,685,227.

(60) Provisional application No. 62/433,019, filed on Dec. 12, 2016.

(51) Int. Cl.
| | | |
|---|---|---|
| *G08G 5/00* | (2006.01) | |
| *G08B 25/00* | (2006.01) | |
| *G08B 13/196* | (2006.01) | |
| *G06V 10/147* | (2022.01) | |
| *G06V 20/52* | (2022.01) | |

(52) U.S. Cl.
CPC ......... *G08B 13/1965* (2013.01); *G08B 25/00* (2013.01); *G08G 5/0013* (2013.01); *G08G 5/0034* (2013.01); *G08G 5/0069* (2013.01); *B64C 2201/127* (2013.01); *B64C 2201/141* (2013.01)

(56) References Cited

U.S. PATENT DOCUMENTS

| | | |
|---|---|---|
| 2016/0107749 A1 | 4/2016 | Mucci |
| 2019/0073524 A1* | 3/2019 | Yi .......................... G06N 3/08 |

OTHER PUBLICATIONS

Schumann et al., "R2U2: Monitoring and Diagnosis of Security Threats for Unmanned Aerial Systems," Runtime Verification, Nov. 15, 2015, pp. 233-249.

* cited by examiner

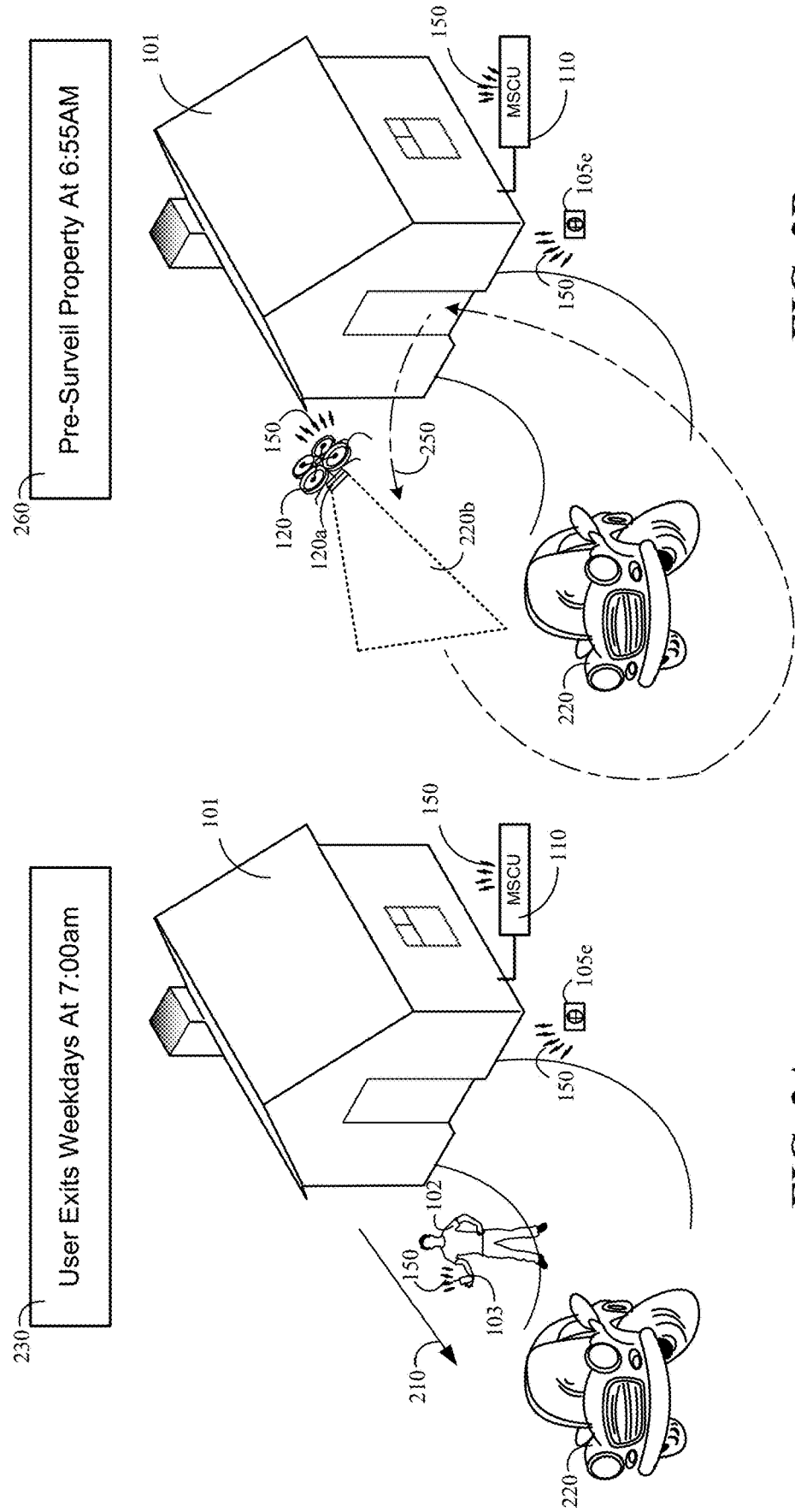

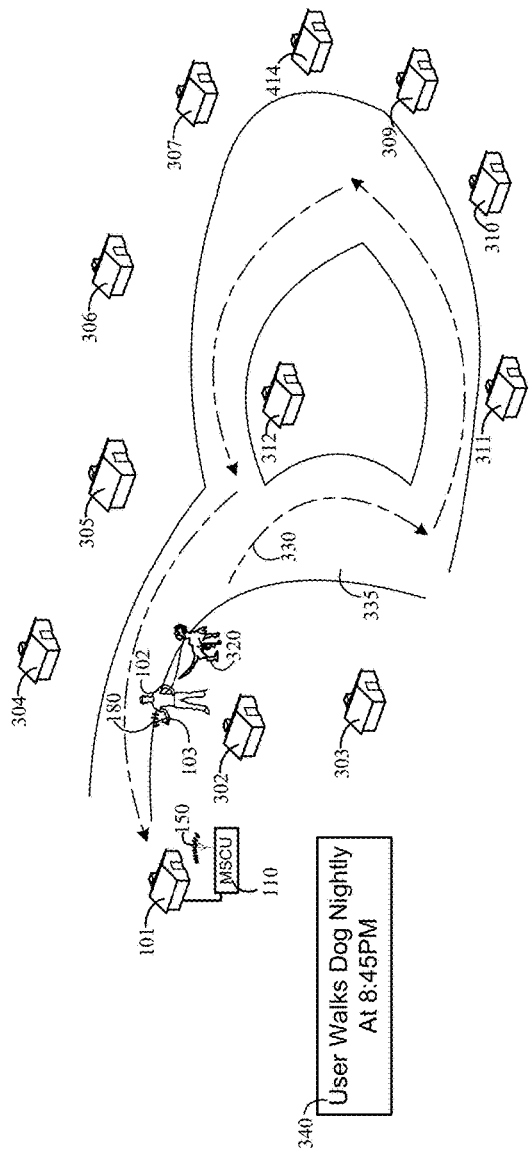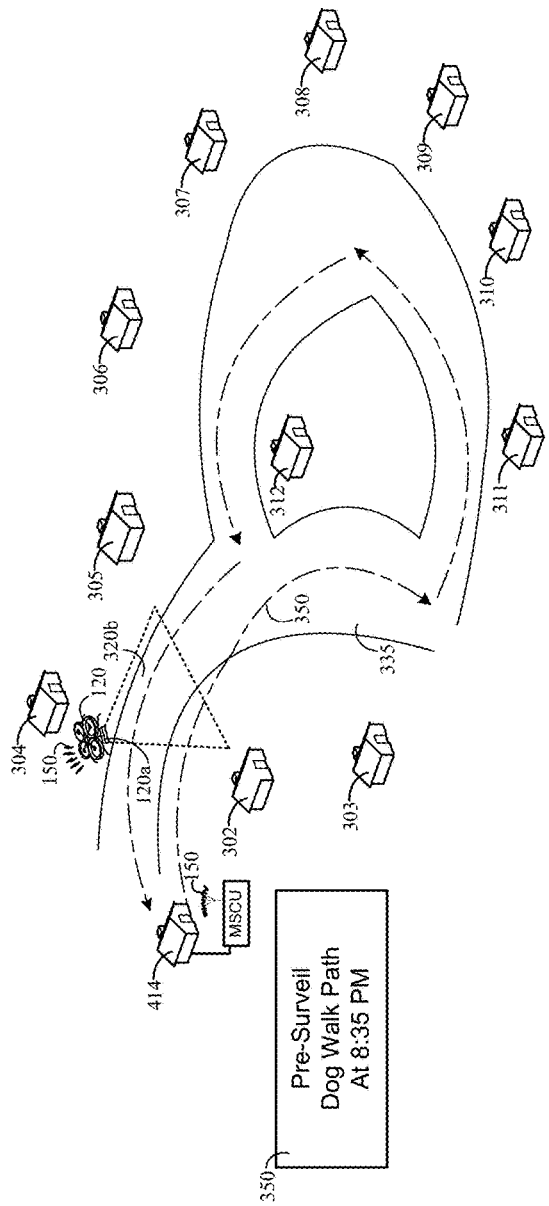

700

```
┌─────────────────────────────────────────────────────────────┐
│  RECEIVE AN INSTRUCTION TO PERFORM PRE-SURVEILLANCE         │
│                                                         710 │
└─────────────────────────────────────────────────────────────┘
                              ↓
┌─────────────────────────────────────────────────────────────┐
│  TRAVEL ALONG A PREDETERMINED NAVIGATION PATH               │
│                                                         720 │
└─────────────────────────────────────────────────────────────┘
                              ↓
┌─────────────────────────────────────────────────────────────┐
│  OBTAIN DATA ASSOCIATED WITH THE ENVIRONMENT WITHIN A       │
│  PREDETERMINED DISTANCE OF THE NAVIGATION PATH          730 │
└─────────────────────────────────────────────────────────────┘
                              ↓
┌─────────────────────────────────────────────────────────────┐
│  DETERMINE A LEVEL OF SAFENESS ASSOCIATED                   │
│  WITH THE ENVIRONMENT BASED ON THE OBTAINED DATA        740 │
└─────────────────────────────────────────────────────────────┘
                              ↓
┌─────────────────────────────────────────────────────────────┐
│  GENERATE A REPORT THAT INDICATES A LEVEL OF SAFENESS       │
│  OF THE ENVIRONMENT WITHIN A PREDETERMINED DISTANCE         │
│  OF THE NAVIGATION PATH                                 750 │
└─────────────────────────────────────────────────────────────┘
```

FIG. 7

DRONE PRE-SURVEILLANCE

CROSS-REFERENCE TO RELATED APPLICATIONS

This application is a continuation of U.S. application Ser. No. 16/901,255, filed Jun. 15, 2020, now allowed, which is a continuation of U.S. application Ser. No. 15/839,710, filed Dec. 12, 2017, now U.S. Pat. No. 10,685,227, issued Jun. 16, 2020, which claims the benefit of the U.S. Provisional Patent Application No. 62/433,019 filed Dec. 12, 2016 and entitled "Drone Pre-Surveillance." The complete disclosures of all of the above patent applications are hereby incorporated by reference in their entirety for all purposes.

BACKGROUND

The use of robotic devices is starting to become more prevalent in a variety of different applications. By way of example, a robotic device may be used by a property monitoring system. In such systems, the robotic device may be configured to navigate to the location of a monitoring system sensor in response to the detection, by the monitoring system, of sensor data generated by the monitoring system sensor.

SUMMARY

Techniques are described for a monitoring system that can use one or more robotic devices to pre-surveil one or more portions of a property based on learned user behavior patterns. The portions of the property pre-surveilled may include portions of the property that are inside the property or outside the property. In some implementations, after the monitoring system learns a particular pattern of user behavior, the monitoring system may use a robotic device such as a drone to pre-surveil the area the user is expected to travel to based on the particular pattern.

The robotic device may include any type of robotic device such as robotic device that navigates on land, a robotic device that navigate on water, and a robotic device that navigates through the air. The property may include any type of property including a residential property, a commercial property, or an industrial property. For purposes of this disclosure, the term "property" may include any portion of a residential property, a commercial property, or an industrial property. A portion of a residential property, a commercial property, or an industrial property may be indoors, outdoors, and any surrounding area that is associated with the property such as yards, streets, sidewalks, parking lots, and the like.

According to one innovative aspect of the present disclosure monitoring system is disclosed for using a drone to pre-surveil at least a portion of one or more properties. The monitoring system may include a plurality of sensors and a monitoring unit that is configured to monitor sensor data generated by one or more of the plurality of sensors. The monitoring unit may include a network interface, one or more processors, and one or more storage devices that include instructions that are operable, when executed by the one or more processors, to cause the one or more processors to perform operations. The operations may include obtaining data that is indicative of one or more acts of an occupant of the property, applying the obtained data that is indicative of one or more acts of the occupant of the property to a pre-surveillance rule that identifies a portion of one or more properties for pre-surveillance based on one or more actions of the occupant of the property indicating that the occupant of the property is expected to travel to the portion of the one or more properties, based on application of the obtained data to the pre-surveillance rule, determining that the pre-surveillance rule is satisfied, based on the determination that the pre-surveillance rule is satisfied, determining a drone navigation path that is associated with the pre-surveillance rule, and transmitting, to a drone, an instruction to perform pre-surveillance of the portion of the one or more properties using the drone navigation path.

Other aspects include corresponding methods, apparatus, and computer programs to perform actions of methods defined by instructions encoded on computer storage devices.

These and other versions may optionally include one or more of the following features. For example, in some implementations, obtaining data that is indicative of one or more acts of an occupant of the property may include obtaining data from one or more user devices that describes a location of the occupant of the property. In such implementations, applying the obtained data that is indicative of one or more acts of the occupant of the property to a pre-surveillance rule includes applying the obtained data from one or more user devices that describes the location of the occupant of the property to the pre-surveillance rule.

In some implementations, obtaining data that is indicative of one or more acts of an occupant of the property may include obtaining data from one or more user devices that is indicative of a first location of the occupant of the property, obtaining data from the one or more user devices that is indicative of a second location of the occupant of the property, and determining, based on the first location and the second location, a change in the location of the occupant of the property. In such implementations, applying the obtained data that is indicative of one or more acts of the occupant of the property to a pre-surveillance rule includes applying data describing the determined change in the location of the occupant of the property to the pre-surveillance rule that identifies.

In some implementations, obtaining data that is indicative of one or more acts of an occupant of the property may include obtaining sensor data generated by one or more of the plurality of sensors. In such implementations, applying the obtained data that is indicative of one or more acts of the occupant of the property to a pre-surveillance rule includes applying the obtained sensor data generated by one or more of the plurality of sensors to the pre-surveillance rule that identifies.

In some implementations, obtaining data that is indicative of one or more acts of an occupant of the property may include obtaining sensor data generated by a first sensor of the plurality of sensors that is indicative of movement in a first portion of the property, obtaining sensor data generated by a second sensor of the plurality of sensors that is indicative of movement in a second, different portion of the property, and determining, based on the sensor data generated by the first sensor and the sensor data generated by the second sensor, a change in a location of the occupant of the property. In such implementations, applying the obtained data that is indicative of one or more acts of the occupant of the property to a pre-surveillance rule includes applying data describing the determined change in the location of the occupant of the property to the pre-surveillance rule.

In some implementations, obtaining data that is indicative of one or more acts of an occupant of the property may include obtaining sensor data generated by one or more of the plurality of sensors that is indicative of movement in a first portion of the property, obtaining data from one or more user devices that is indicative of a location of the occupant of the property, and determining, based on the sensor data and the data from the one or more user devices, a change in the location of the occupant of the property. In such implementations, applying the obtained data that is indicative of one or more acts of the occupant of the property to a pre-surveillance rule includes applying data describing the determined change in the location of the occupant of the property to the pre-surveillance rule.

In some implementations, determining that the pre-surveillance rule is satisfied may include determining, based on the obtained data, that the one or more acts of the occupant of the property occurred at a current time, and determining that the current time satisfies a trigger time defined by the pre-surveillance rule.

In some implementations, determining that the pre-surveillance rule is satisfied may include determining, based on the obtained data, that the one or more acts of the occupant of the property occurred at a current time and determining that the occurrence of the one or more acts at the current time falls within a predetermined time range defined by the pre-surveillance rule.

In some implementations, determining the drone navigation path that is associated with the pre-surveillance rule may include selecting a predetermined drone navigation path that is associated with the pre-surveillance rule.

In some implementations, the portion of the one or more properties includes an indoor portion of the property, an outdoor portion of the property, or both.

In some implementations, the portion of the one or more properties includes (i) an indoor portion of the property, (ii) an outdoor portion of the property, (iii) an outdoor portion of a different property other than the property, or (iv) any combination thereof.

In some implementations, the portion of the one or more properties comprises a portion of a parking lot for the property.

In some implementations, the plurality of sensors includes at least one of a motion sensor, a contact sensor, or a temperature sensor.

In some implementations, the monitoring unit resides at a location that is remote from the property.

In some implementations, the may further include a drone, wherein the drone comprises one or more second storage devices that include second instructions that are operable, when executed by the one or more second processors, to cause the one or more second processors to perform second operations. The second operations may include receiving, by the drone, the instruction transmitted by the monitoring unit to perform pre-surveillance of an area associated with the drone navigation path, navigating along the drone navigation path, obtaining video data of the area that is associated with the drone navigation path, and analyzing the obtained video data to determine a level of safeness of the area associated with the drone navigation path based on a one or more factors that comprise whether the drone identified a loitering person, a person with a weapon, a person wearing a mask, a person who has been issued an outstanding warrant for arrest, or a combination thereof.

In some implementations, the operations may also include receiving, from the drone, data that provides an indication of a level of safeness of the area that is associated with the drone navigation path, wherein the level of safeness is based on one or more factors that include whether the drone identified a loitering person, a person with a weapon, a person wearing a mask, a person who has been issued an outstanding warrant for arrest, or a combination thereof.

In some implementations, the data that provides an indication of the level of safeness that is associated with the drone navigation path includes a probability that the area is safe.

In some implementations, the drone includes a flying quadcopter drone.

The monitoring system described by the present disclosure provides multiple advantages over existing systems. For example, the monitoring system provides on-demand monitoring and pre-surveillance of portions of one or more properties without detection of an alarm event and within instructing the drone to navigate to a particular sensor location. Such a system can reduce crimes by stopping a person from traveling along a path whether a potential trespasser, hazard, or other threat may have been detected by the drone. In some implementations, the monitoring system can also help to alleviate the strain on local law enforcement by reducing their need to regularly surveil certain neighborhoods because the pre-surveillance drones are performing on-demand pre-surveillance of one or more paths to be traveled by a person. In one or more of these ways, the system can increase safety and security of a one or more persons because of the pre-surveillance operations performed by the one or more drones.

BRIEF DESCRIPTION OF THE DRAWINGS

FIG. 2A is a contextual diagram of an example of a monitoring system that tracks user behavior to detect user behavior patterns.

FIG. 2B is a contextual diagram of an example of a monitoring system that uses a drone to perform pre-surveillance outside a property based on a detected user behavior pattern.

FIG. 3A is a contextual diagram of an example of a monitoring system that tracks user behavior to detect long-range user behavior patterns.

FIG. 3B is a contextual diagram of an example of a monitoring system that uses a drone to perform long-range pre-surveillance outside a property based on a detected user behavior pattern.

FIG. 7 is a flowchart of a process for performing drone pre-surveillance.

DETAILED DESCRIPTION

Figure 1:
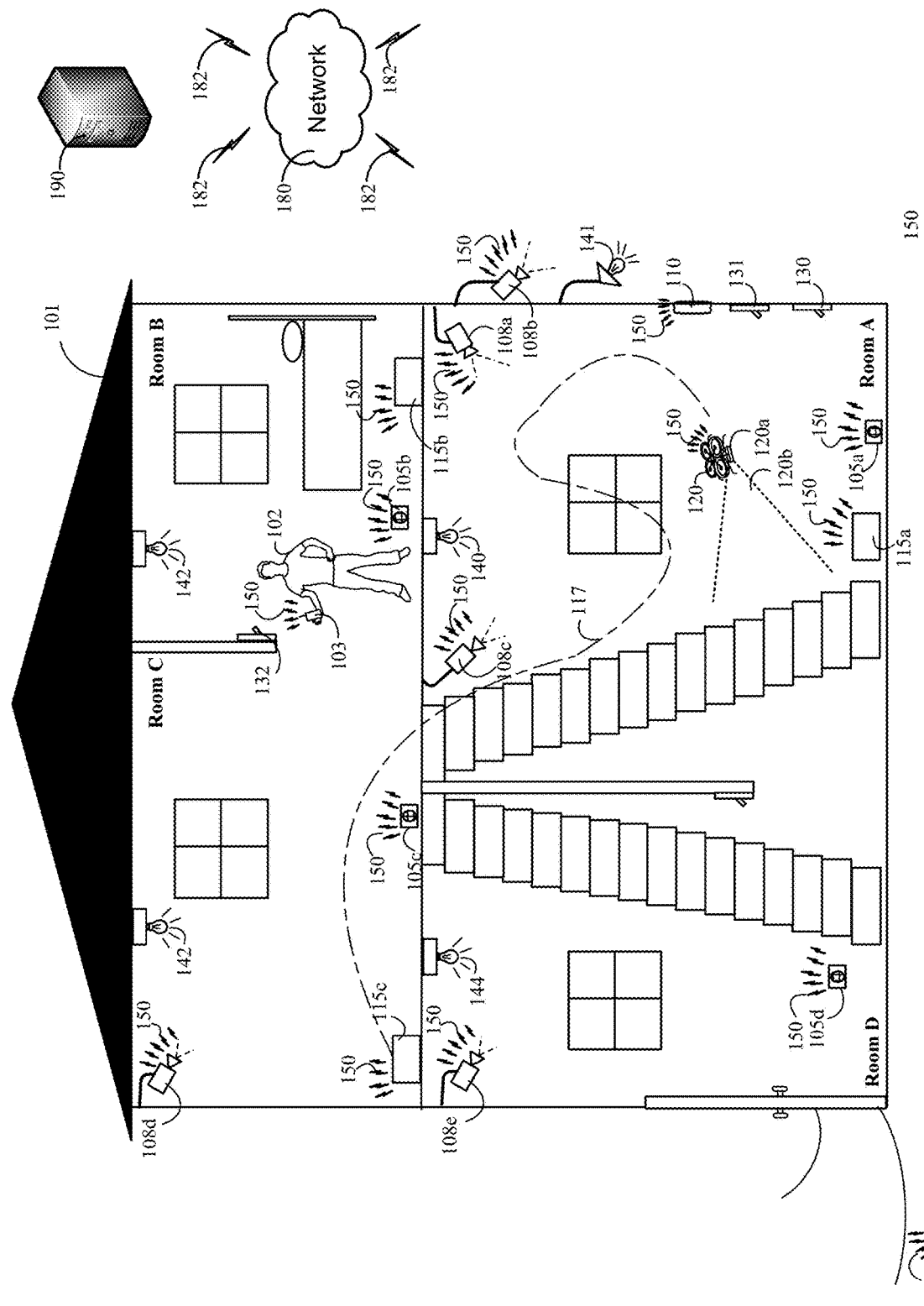
FIG. 1 is a contextual diagram of an example of a monitoring system that uses a drone to perform pre-surveillance inside a property

FIG. 1 is a contextual diagram of an example of a monitoring system 100 that uses a drone 120 to perform pre-surveillance inside a property 101.

The monitoring system 100 includes one or more sensors 105a, 105b, 105c, 105d, 105e, a monitoring system control unit 110, one or more wireless charging stations 115*a*, 115*b*, 115*c*, and at least one drone 120. In some implementations, the monitoring system 100 may also include one or more cameras 108*a*, 108*b*, 108*c*, 108*d*, 108*e*. In some implementations, the monitoring system 100 may also include a user device 103. In such instances, the monitoring system control unit 110, drone 120, or other components of monitoring system 100 may be able to communicate with the user device 103 using the network 150. In some implementations, the monitoring system 100 may also include a monitoring application server 190. In such instances, the monitoring system control unit 110, drone 120, or other components of monitoring system 100 may communicate with the monitoring application server 190 via the network 180 using one or more communications links 182. The network 180 may include one or more networks such as a LAN, a WAN, a cellular network, the Internet, or the like.

The monitoring system 100 may facilitate networked communication between each component of monitoring system 100 such as one or more sensors 105*a*, 105*b*, 105*c*, 105*d*, 105*e*, one or more cameras 108*a*, 108*b*, 108*c*, 108*d*, 108*e*, a monitoring system control unit 110, one or more wireless charging stations 115*a*, 115*b*, 115*c*, and at least one drone 120 via a network 150. The network 150 may include, for example, any type of wired network, wireless network, or a combination thereof, that facilitates communication between the components of monitoring system 100 including a LAN, a WAN, a cellular network, the Internet, or a combination thereof. One or more devices connected to network 150 may also be able to communicate with one or more remote devices such as the monitoring application server 190 via the network 180 using one or more communication links 182. Though the user device 103 is depicted as a device that can communicate with one or more components of monitoring system 100 connected to network 150, the present disclosure need not be so limited. For instance, there may be instances where the user device 103 is a located outside the range of network 150. However, when located outside the network 150, the user device may still communicate with one or more components of monitoring system 100 via network 180. Then, the user device 103 may communicate with the components of monitoring system 100 using a combination of network 180, network 150, and one or more communications links 182.

With reference to FIG. 1, the monitoring system 100 is configured to use a drone 120 to perform pre-surveillance. To facilitate pre-surveillance as described with respect to FIG. 1, the monitoring system control unit 110 can obtain, aggregate, and analyze data related to the behavior of a user 102 to identify one or more patterns. The data obtained, aggregated, and analyzed by the monitoring system control unit 110 may include, for example, data that is output by one or more sensors 105*a*, 105*b*, 105*c*, 105*d*, 105*e* over a predetermined period of time. Alternatively, or in addition, the data obtained, aggregated, and analyzed by the monitoring system control unit 110 may include data that is detected by one or more sensors onboard the drone 120. Alternatively, or in addition, the data obtained, aggregated, and analyzed by the monitoring system control unit 110 may include data obtained from one or more user devices 103. The user device 103 may include, for example, a smartphone (or other handheld device), a smartwatch (or other wearable device), or the like that is capable of tracking the user's 102 movements. Such data may be stored locally and analyzed by the monitoring system control unit 110 in order to identify patterns that can be used to create pre-surveillance rules. Alternatively, such data may be forwarded for storage and analysis by the monitoring application server 190 via network 180 using one or more communications links. In such instances, the monitoring application server 190 may analyze the data to identify patterns that can be used to create pre-surveillance rules. The pre-surveillance rules, once created, may be stored and executed by the monitoring system control unit 110 using a drone 120.

By way of example, the monitoring system control unit 110 may determine that every morning, for at least a predetermined period of time, the user 102 wakes up in Room B, walks into Room C, and walks down the stairs from Room C to Room A. The monitoring system control unit 110 may make this determination based on sensor data that it obtained from sensors 105*b*, 105*c*, and 105*a* indicating that the sensors 105*b*, 105*c*, and 105*a* detect movement from Room B to Room A. In addition, the sensor data may include a timestamp. Alternatively, the monitoring system control unit may associate a timestamp with sensor data upon its receipt.

Using timestamp data associated with obtained data that is indicative of the user's behavior (e.g., sensor data, sensor data collected by a drone 120, video data collected by a drone 120, image data collected by a drone 120, data from a user device 103, or the like), the monitoring system control unit 110 may determine that movement between sensor 105*c* and 105*a* consistently occurs at 6:30 am. Based on this analysis of data that is indicative of the user's behavior over a predetermined period of time, the monitoring system control unit 110 may generate a pre-surveillance rule to pre-surveil the downstairs of property 101 (e.g., Room A and Room D) at least a predetermined amount of time prior to 6:30 am. For example, such a pre-surveillance rule may trigger pre-surveillance of the Room A and Room D 5 minutes prior to 6:30 am at 6:25 am. The pre-surveillance rule may be stored, and enforced, by the monitoring system control unit 110. The pre-surveillance rule may include (i) a user's behavioral pattern, (ii) a trigger time (e.g., 6:25 am) that is a predetermined amount of time before the user's 102 behavioral pattern begins (e.g., 6:30 am), (iii) a location (e.g., downstairs, upstairs, parking lot, driveway, neighborhood, or the like), (iv) an initial predetermined navigational path (e.g., navigation path 117), or a combination thereof.

Assume that the example of FIG. 1 depicts a morning after user 102 wakes up and before the user 102 walks downstairs. At 6:25 am, the stored pre-surveillance rule may trigger the monitoring system control unit 110 to transmit an instruction to the drone 120 charging on the wireless charging station 115*c*. The drone 120 may receive the instruction, navigate on a predetermined navigation path 117, and pre-surveil the downstairs of property 101 prior to the user 102 walking downstairs at 6:30 am. The drone 120 may scan the entire downstairs of property 101 using a camera 120*a* to capture video and images of the downstairs of property 101. In some implementations, the video or images 120*b* may be streamed to the user's 102 user device 103. Once the drone's pre-surveillance is complete, the drone 120 may generate a status report that is transmitted to the user's device 103.

The status report may provide an indication as to the level of safety associated with the portion of the property 101 that was pre-surveilled. For example, the status report may indicate whether the portion of the property 101 that was pre-surveilled is safe, unsafe, or unknown (e.g., due to surveillance difficulties). The status report may provide the user with an estimated level of safeness that is associated with the pre-surveilled portion of the property. For instance, the property may be determined to be relatively safe. In some instances, the level of safeness may be provided in the form of a probability. In the example of FIG. 1, the drone 120 does not find any intruders, abnormalities, or the like based on the drone's 120 scan of the downstairs of property 101. Accordingly, the drone 120 may transmit a status report to the user's 102 user device 103 indicating that it is safe for the user 102 to walk down the stairs from Room B to Room A.

The monitoring system control unit 110 is described as being local monitoring unit that is located at the property 101. However, the present disclosure need not be so limited. For example, the functionality described with reference to the monitoring system control unit 110 may also be embodied in a monitoring unit that is remote from property. Such a monitoring unit may include, for example, the monitoring application server 190 that can obtain data (e.g., location data from user devices, sensor data from sensors, drone data from one or more drones, or the like) via one or more networks 150, 180 and analyze the obtained data in the same way described with respect to the monitoring system control unit 110. Upon determining that a pre-surveillance rule should be executed, the remote monitoring unit such as the monitoring application server 190 may transmit one or more instructions to the drone 120 that instruct the drone 120 to (i) navigate a flight path associated with a pre-surveillance rule and (ii) perform pre-surveillance of an area associated with the flight path. Alternatively, the remote monitoring unit can transmit one or more instructions to the local monitoring unit, and then the local monitoring unit can transmit one or more instructions to the drone 120 to (i) navigate a flight path associated with a pre-surveillance rule and (ii) perform pre-surveillance of an area associated with the flight path.

FIG. 2A is a contextual diagram of an example of a monitoring system 100 that tracks user behavior to detect user behavior patterns.

The example of FIG. 2A shows the outside of the property 101 that employs a monitoring system 100 shown and described with reference to FIG. 1. The monitoring system 100 includes a sensor 105e that can transmit sensor data via the network 150 to a monitoring system control unit 110.

Over a predetermined period of time, the monitoring system control unit 110 of monitoring system 100 may receive sensor data from sensor 105e via the network 150. In some implementations, the sensor 105e may include a motion sensor that detects movement of a user 102 as the user 102 exits 210 the property 101. In some instances, the sensor 105e may not be used alone in order to determine when the user leaves the property. For instance, in some implementations, the monitoring system control unit 110 may analyze sensor data from the sensor 105d (see FIG. 1) and the sensor 105e in combination. If motion is detected by both sensors 105d, 105e, then the motion is more likely to be a user exiting 210 the property 101 than if only the outdoor sensor 105e detects the movement. If only the outside sensor 105e detects movement that is not associated with corresponding movement detected by sensor 105d, then the movement detected by 105e may be the result of something other than the user 102 exiting the property 101.

After analyzing the sensor data that was obtained from one or more sensors associated with property 101 over a predetermined period of time, the system may determine 230 that the user 102 regularly exits 210 the property 101 on weekdays at 7:00 am. Based on this determination, the monitoring system control unit 110 may create a pre-surveillance rule that, when triggered, results in the monitoring system control unit 110 instructing a drone 120 to pre-surveil the exterior of the property 101 prior to the user 102 leaving the property 120. The pre-surveillance rule may include (i) a trigger time (e.g., 6:55 am) that is a predetermined amount of time before the user's 102 behavioral pattern begins (e.g., 7:00 am), (ii) a location (e.g., downstairs, upstairs, parking lot, driveway, neighborhood, or the like), (iii) an initial predetermined navigational path (e.g., navigation path 250 in FIG. 2B), or a combination thereof.

In the example of FIG. 2A, the monitoring system control unit 110 analyzes data obtained by one or more sensors such as sensors 105d, 105e to determine when the user 102 exits the property 101. However, the present disclosure need not be so limited. Instead, the monitoring system control unit 110 may also obtain other type of data that can be analyzed to determine a pattern of user 102 behavior. For instance, the user device 103 may keep a log of times the user exists the property that can be accessed by, or provided to, the monitoring system control unit 110. Alternatively, or in addition, the user device 103 may transmit a notification to the monitoring system control unit 110 each time the user travels a predetermined distance from the property 101 such as, e.g., 5 feet, 10 feet, 15 feet, or the like. The notification may include a time stamp. Such data may be analyzed to identify user 102 patterns in addition to, or independent of, sensor data obtained by the monitoring system control unit 110. The user device 103 may include, e.g., a smartphone (or other handheld device), a smartwatch (or other wearable device), or the like that can store obtained location data, transmit location data, or the like.

FIG. 2B is a contextual diagram of an example of a monitoring system 100 that uses a drone to perform pre-surveillance outside a property based on a detected user behavior pattern.

With reference to FIG. 2B, assume that the example of FIG. 2B depicts a weekday morning prior to when the user 102 exits the property to go to work. The time at issue in the example of FIG. 2B is 6:55 am. At 6:55 am, the stored pre-surveillance rule 260 may trigger the monitoring system control unit 110 to transmit an instruction to the drone 120 charging on a wireless charging station. The drone 120 may receive the instruction, navigate on a predetermined navigation path 250, and pre-surveil an outside portion of the property 101 that exists within a predetermined distance of the predetermined navigation path. The drone 120 may scan an outside portion of the property 101 using a camera 120a to capture video and images 220b of the environment that exists around all sides of the user's car 220. The predetermined flight path 250 may include navigating out the front door (or another opening such as an open window, open garage door, or the like) navigating a path towards the user's 102 car 220, around the car 220, and then back to the property 101. In some implementations, the video or images 220b may be streamed to the user's 102 user device 103 using network 150. Once the drone's pre-surveillance is complete, the drone 120 may generate a status report that is transmitted to the user's device 103.

In the example of FIG. 2A, the drone 120 did not detect any potential safety threats. Accordingly, the drone 120 may transmit a message back to the user device 103 indicating that the outside of the property 101 within a predetermined distance of the predetermined navigation path is safe. As a result, the user 102 knows that it is safe to walk to the user's car 220.

Figure 2C:
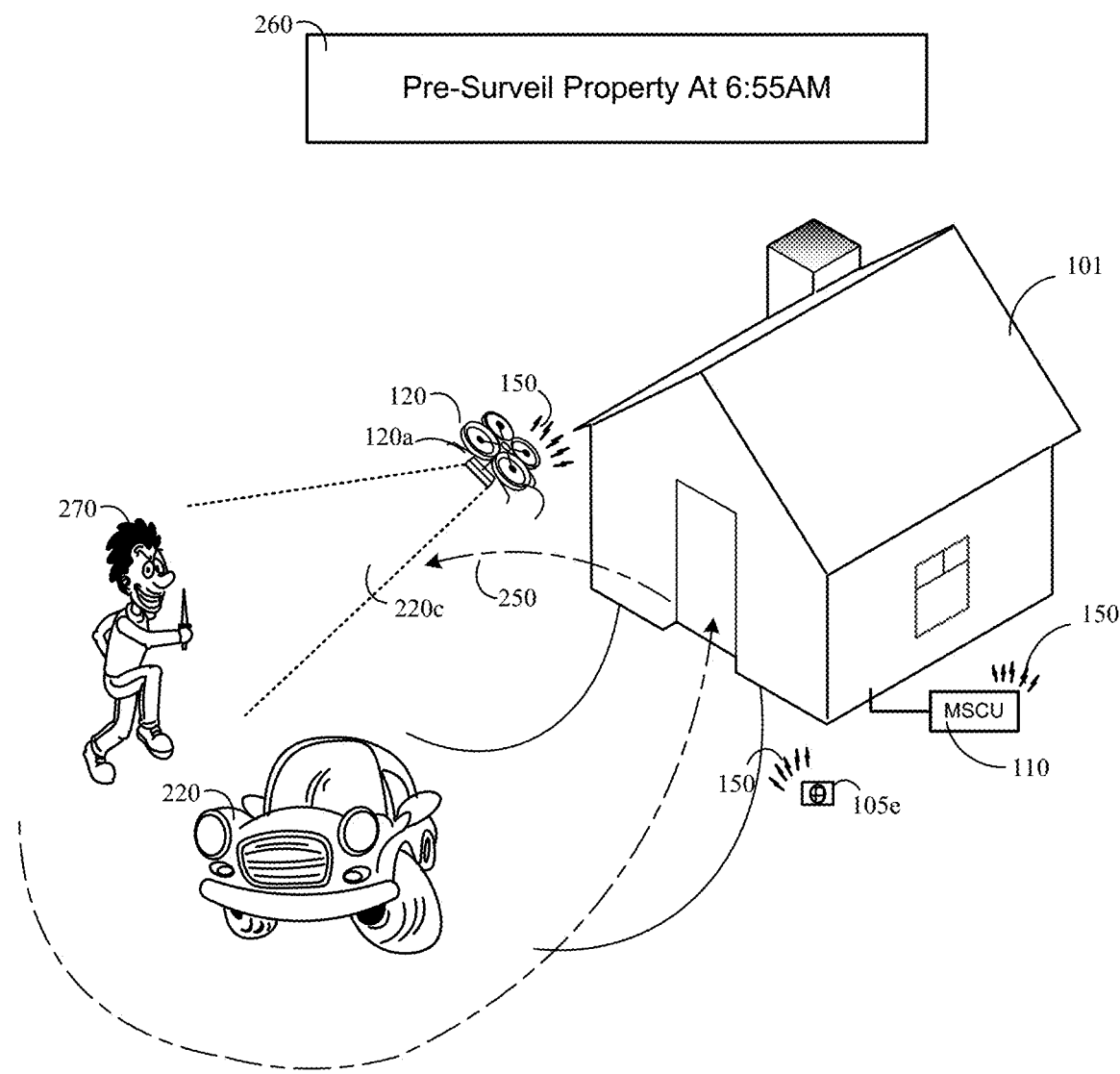
FIG. 2C is another contextual diagram of an example of a monitoring system that uses a drone to perform pre-surveillance outside a property based on a detected user behavior pattern.

FIG. 2C is another contextual diagram of an example of a monitoring system 100 that uses a drone to perform pre-surveillance outside a property based on a detected user behavior pattern.

With reference to FIG. 2C, assume that the example of FIG. 2C depicts a weekday morning prior to when the user 102 exits the property to go to work. The time at issue in the example of FIG. 2C is 6:55 am. At 6:55 am, the stored pre-surveillance rule 260 may trigger the monitoring system control unit 110 to transmit an instruction to the drone 120 charging on a wireless charging station. The drone 120 may receive the instruction, navigate on a predetermined navigation path 250, and pre-surveil an outside portion of the property 101 that exists within a predetermined distance of the predetermined navigation path.

However, in FIG. 2C, the drone 120 captures video and images 220c that show a person 270 loitering in the vicinity of the car 220. In addition, the drone 120 may snap a picture of the loitering person's 270 hands, search an image database, and determine that the loitering person 270 is holding a knife. Based on the identification of a loitering person 270 that is holding a knife, the drone 120 may transmit a notification to the user device 103 that indicates it is not safe for the user to exit the property 101.

In some instances, the drone 120 may engage the loitering person 270 with varying levels of aggressiveness based on the potential threat posed by the loitering person in an attempt to make the area safe for the user to travel to. The level of aggressiveness used by the drone 120 may be based on the level of safeness determination made by the drone 120. For example, if the potential threat is merely that the loitering person 270 is loitering, then the drone 120 may try to scare the loitering person off by flashing lights or playing loud audio signals. However, by way of another example, if the loitering person 270 is determined to be wearing a mask and a facial recognition scan and search determines that the loitering person has been issued an outstanding warrant out for the person's arrest, the drone 120 may take more aggressive action by swarming the loitering person 270 by flying around the loitering person at high speeds in random patterns. Moreover, as another example, if the drone 120 determines, based on facial recognition analysis, that the loitering person is a person who is a known terrorist wanted by the FBI, the drone 120 may crash into the loitering person 170, shock the loitering person 170, deploy a net to capture the loitering person 270, or the like.

Though the example of FIG. 2C is shown in the context of a drone 120 determining whether it is safe for a user to leave the user's house and walk to the user's vehicle 220, the present disclosure need not be so limited. For example, such a system may also be implemented by employers, hospitals, business owners or the like. In such instances, a drone such as drone 120 may be dispatched ahead of the time a user is about to leave (e.g., when a user's shift is nearing an end). Then, the drone may pre-surveil a parking garage associated with the user's office building, prior to the user walking to the user's car. The drone can report back to the user's device 103 letting the user 102 know whether the safeness of the parking garage is determined to be safe, unsafe, or unknown.

FIG. 3A is a contextual diagram of an example of a monitoring system 100 that tracks user 102 behavior to detect long-range user 102 behavior patterns.

In some implementations, the monitoring system 100 may provide drone pre-surveillance at longer ranges. With reference to FIG. 3A, for example, the user 102 leaves the property 101 to take his dog 320 for a walk. The monitoring system control unit 110 may determine, based on sensor data output by one or more sensors of monitoring system 100, that the user 102 left the property 101. Once the user leaves the property 101, the user's 102 user device 103 may connect to a network 180 such as a LAN, a WAN, a cellular network, the Internet, or the like. While outside of the reach of network 150 of property 101, the user's device 102 may include one or more applications that report information back to the monitoring system control unit 110. Accordingly, while the user 102 walks the user's dog along a path 330 through the neighborhood shown in FIG. 3A, the user's 102 user device 103 periodically reports the user's 102 location. The user's device 103 may include a smartphone (or other handheld device), a smartwatch (or other wearable device), or the like.

Based on an analysis of historical sensor data output by one or more sensors of monitoring system 100 such as sensor 105e (FIGS. 1, 2A, 2B, 2C) and historical data received from the user's device 103, the monitoring system control unit 110 may determine 340 that the user 102 takes the dog for a nightly walk through the neighborhood on path 330 every evening at 8:45 pm. Accordingly, the monitoring system control unit may generate a pre-surveillance rule that triggers pre-surveillance of the user's 102 route 330 through the neighborhood of FIG. 3A. The pre-surveillance rule may include (i) a trigger time (e.g., 8:35 PM) that is a predetermined amount of time before the user's 102 behavioral pattern begins (e.g., 8:45 PM), (ii) a location (e.g., downstairs, upstairs, parking lot, driveway, neighborhood, or the like), (iii) an initial predetermined navigational path (e.g., dog walk path 330), or a combination thereof.

FIG. 3B is a contextual diagram of an example of a monitoring system 100 that uses a drone 120 to perform long-range pre-surveillance outside a property 101 based on a detected user 102 behavior pattern.

With reference to FIG. 3B, assume that the example of FIG. 3B depicts a day on any night of the week just prior to when the user 102 exits the property to walk his dog. The time at issue in the example of FIG. 3B is 8:35 PM. At 8:35 PM, the stored pre-surveillance rule 360 may trigger the monitoring system control unit 110 to transmit an instruction to the drone 120 charging on a wireless charging station. The drone 120 may receive the instruction, navigate on a predetermined navigation path 350, and perform long-range pre-surveillance of the neighborhood of FIG. 3B prior to the user 102 taking the user's dog 320 for a walk. The long-range pre-surveillance of the neighborhood of FIG. 3B may include pre-surveillance of the vicinity of the user's dog walk path. For example, the drone 120 may pre-surveil the area that is within a predetermined distance of navigational flight path 350. The drone 120 may scan the portion of the neighborhood that is within a predetermined distance of the navigational flight path 350 using a camera 120a to capture video and images 320b. The predetermined flight path 350 may include navigating out the front door (or another opening such as an open window, open garage door, or the like) of the property 101, navigating a path down the user's street towards property 303, around the cul-de-sac towards property 308 and then towards property 306, and then back to property 101. In some implementations, the video or images 320b may be streamed to the user's 102 user device 103 using networks 180, 150, or a combination thereof. Once the drone's pre-surveillance is complete, the drone 120 may generate a status report that is transmitted to the user's device 103. The status report may provide an indication as the level of safeness of the dog walk path 330. In the example of FIG. 3B, since the drone 120 did not encounter any safety issues, the drone 120 may report that the dog walk path 330 is safe.

Though the example of long-range pre-surveillance described herein is in the context of a dog walk, the present discloses should not be so limited. For example, long-range surveillance may also extend to activities such as walks to a convenience store, jogging paths, marathon training paths, or the like.

Figure 4:
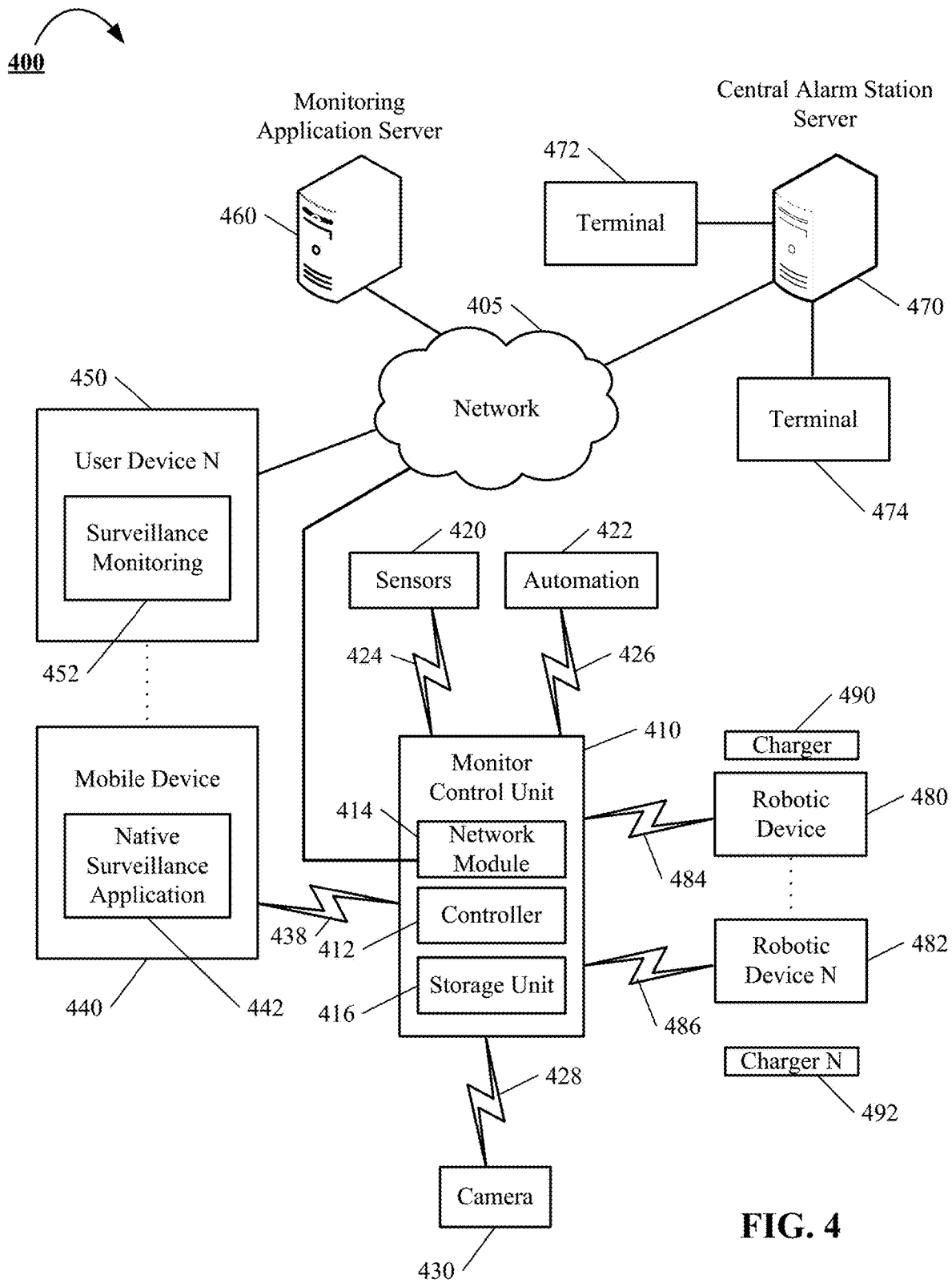
FIG. 4 is a block diagram of an example of a monitoring system that can use one or more drones to perform pre-surveillance.

FIG. 4 is a block diagram of an example of a monitoring system 400 that can use one or more drones to perform pre-surveillance.

The electronic system 400 includes a network 405, a monitoring system control unit 410, one or more user devices 440, 450, a monitoring application server 460, and a central alarm station server 470. In some examples, the network 405 facilitates communications between the monitoring system control unit 410, the one or more user devices 440, 450, the monitoring application server 460, and the central alarm station server 470.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412, a network module 414, and storage unit 416. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

In some implementations, the monitoring system control unit 410 may store received input from sensors, detectors, user devices 440 and 450, or other devices included in system 400 may be stored in the storage unit 416. The monitoring system control unit 410 may analyze the stored input to detect one or more user behavioral patterns. Once a user behavioral pattern is identified, the monitoring system control unit 410 may generate a pre-surveillance rule that, when triggered, instructs one or more robotic devices 480 and 482 to perform pre-surveillance of a location associated with the user's behavioral patterns.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes one or more sensors or detectors. For example, the monitoring system may include multiple sensors 420. The sensors 420 may include a contact sensor, a motion sensor, a glass break sensor, or any other type of sensor included in an alarm system or security system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The monitoring system control unit 410 communicates with the module 422 and the camera 430 to perform surveillance or monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the monitoring system control unit 410. For instance, the module 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the monitoring system control unit 410 and the camera 430 receives commands related to operation from the monitoring application server 460.

The system 400 further includes one or more robotic devices 480 and 482. The robotic devices 480 and 482 may be any type of robots that are capable of moving and taking actions that assist monitoring user behavior patterns. For example, the robotic devices 480 and 482 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 480 and 482 may be robotic devices that are intended for other purposes and merely associated with the monitoring system 400 for use in appropriate circumstances. For instance, a robotic vacuum cleaner device may be associated with the monitoring system 400 as one of the robotic devices 480 and 482 and may be controlled to take action responsive to monitoring system events.

In some examples, the robotic devices 480 and 482 automatically navigate within a property. In these examples, the robotic devices 480 and 482 include sensors and control processors that guide movement of the robotic devices 480 and 482 within the property. For instance, the robotic devices 480 and 482 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 480 and 482 may include control processors that process output from the various sensors and control the robotic devices 480 and 482 to move along a path that reaches the desired destination and avoids obstacles. In this regard, the control processors detect walls or other obstacles in the property and guide movement of the robotic devices 480 and 482 in a manner that avoids the walls and other obstacles.

In addition, the robotic devices 480 and 482 may store data that describes attributes of the property. For instance, the robotic devices 480 and 482 may store a floorplan and/or a three-dimensional model of the property that enables the robotic devices 480 and 482 to navigate the property. During initial configuration, the robotic devices 480 and 482 may receive the data describing attributes of the property, determine a frame of reference to the data (e.g., a home or reference location in the property), and navigate the property based on the frame of reference and the data describing attributes of the property. Further, initial configuration of the robotic devices 480 and 482 also may include learning of one or more navigation patterns in which a user provides input to control the robotic devices 480 and 482 to perform a specific navigation action (e.g., fly to an upstairs bedroom and spin around while capturing video and then return to a home charging base). In this regard, the robotic devices 480 and 482 may learn and store the navigation patterns such that the robotic devices 480 and 482 may automatically repeat the specific navigation actions upon a later request.

In addition to navigation patterns that are learned during initial configuration, the robotic devices 480 and 482 may also be configured to learn additional navigational patterns. For instance, a robotic devices 480 and 482 can be programmed to travel along particular navigational paths in response to an instruction to perform pre-surveillance of a particular location associated with a user behavioral pattern. In some implementations, for example, the particular pre-surveillance navigational pattern may be based on, for example, a navigational pattern that the user follows when engaged in the behavioral pattern associated with a triggered pre-surveillance rule.

In some examples, the robotic devices 480 and 482 may include data capture and recording devices. In these examples, the robotic devices 480 and 482 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 480 and 482 to take and store a biometric sample that can be used to identify the person (e.g., a biometric sample with DNA that can be used for DNA testing).

In some implementations, the robotic devices 480 and 482 may include output devices. In these implementations, the robotic devices 480 and 482 may include one or more displays, one or more speakers, one or more projectors, and/or any type of output devices that allow the robotic devices 480 and 482 to communicate information to a nearby user. The one or more projectors may include projectors that project a two-dimensional image onto a surface (e.g., wall, floor, or ceiling) and/or holographic projectors that project three-dimensional holograms into a nearby space.

The robotic devices 480 and 482 also may include a communication module that enables the robotic devices 480 and 482 to communicate with the monitoring system control unit 410, each other, and/or other devices. The communication module may be a wireless communication module that allows the robotic devices 480 and 482 to communicate wirelessly. For instance, the communication module may be a Wi-Fi module that enables the robotic devices 480 and 482 to communicate over a local wireless network at the property. The communication module further may be a 900 MHz wireless communication module that enables the robotic devices 480 and 482 to communicate directly with the monitoring system control unit 410. Other types of short-range wireless communication protocols, such as Bluetooth, Bluetooth LE, Zwave, Zigbee, etc., may be used to allow the robotic devices 480 and 482 to communicate with other devices in the property.

The robotic devices 480 and 482 further may include processor and storage capabilities. The robotic devices 480 and 482 may include any suitable processing devices that enable the robotic devices 480 and 482 to operate applications and perform the actions described throughout this disclosure. In addition, the robotic devices 480 and 482 may include solid state electronic storage that enables the robotic devices 480 and 482 to store applications, configuration data, collected sensor data, and/or any other type of information available to the robotic devices 480 and 482.

The robotic devices 480 and 482 are associated with one or more charging stations 490 and 492. The charging stations 490 and 492 may be located at predefined home base or reference locations in the property. The robotic devices 480 and 482 may be configured to navigate to the charging stations 490 and 492 after completion of tasks needed to be performed for the monitoring system 400. For instance, after completion of a monitoring operation or upon instruction by the monitoring system control unit 410, the robotic devices 480 and 482 may be configured to automatically fly to and land on one of the charging stations 490 and 492. In this regard, the robotic devices 480 and 482 may automatically maintain a fully charged battery in a state in which the robotic devices 480 and 482 are ready for use by the monitoring system 400.

The charging stations 490 and 492 may be contact based charging stations and/or wireless charging stations. For contact based charging stations, the robotic devices 480 and 482 may have readily accessible points of contact that the robotic devices 480 and 482 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 480 and 482 may charge through a wireless exchange of power. In these cases, the robotic devices 480 and 482 need only locate themselves closely enough to the wireless charging stations for the wireless exchange of power to occur. In this regard, the positioning needed to land at a predefined home base or reference location in the property may be less precise than with a contact based charging station. Based on the robotic devices 480 and 482 landing at a wireless charging station, the wireless charging station outputs a wireless signal that the robotic devices 480 and 482 receive and convert to a power signal that charges a battery maintained on the robotic devices 480 and 482.

In some implementations, each of the robotic devices 480 and 482 has a corresponding and assigned charging station 490 and 492 such that the number of robotic devices 480 and 482 equals the number of charging stations 490 and 492. In these implementations, the robotic devices 480 and 482 always navigate to the specific charging station assigned to that robotic device. For instance, the robotic device 480 may always use changing station 490 and the robotic device 482 may always use changing station 492.

In some examples, the robotic devices 480 and 482 may share charging stations. For instance, the robotic devices 480 and 482 may use one or more community charging stations that are capable of charging multiple robotic devices 480 and 482. The community charging station may be configured to charge multiple robotic devices 480 and 482 in parallel. The community charging station may be configured to charge multiple robotic devices 480 and 482 in serial such that the multiple robotic devices 480 and 482 take turns charging and, when fully charged, return to a predefined home base or reference location in the property that is not associated with a charger. The number of community charging stations may be less than the number of robotic devices 480 and 482.

Also, the charging stations 490 and 492 may not be assigned to specific robotic devices 480 and 482 and may be capable of charging any of the robotic devices 480 and 482. In this regard, the robotic devices 480 and 482 may use any suitable, unoccupied charging station when not in use. For instance, when one of the robotic devices 480 and 482 has completed an operation or is in need of battery charge, the monitoring system control unit 410 references a stored table of the occupancy status of each charging station and instructs the robotic device to navigate to the nearest charging station that is unoccupied.

The sensors 420, the module 422, the camera 430, and the robotic devices 480 and 482 communicate with the controller 412 over communication links 424, 426, 428, 432, 484, and 486. The communication links 424, 426, 428, 432, 484, and 486 may be a wired or wireless data pathway configured to transmit signals from the sensors 420, the module 422, the camera 430, and the robotic devices 480 and 482 to the controller 412. The sensors 420, the module 422, the camera 430, and the robotic devices 480 and 482 may continuously transmit sensed values to the controller 412, periodically transmit sensed values to the controller 412, or transmit sensed values to the controller 412 in response to a change in a sensed value.

The communication links 424, 426, 428, 432, 484, and 486 may include a local network. The sensors 420, the module 422, the camera 430, and the robotic devices 480 and 482 and the controller 412 may exchange data and commands over the local network. The local network may include 802.11 "WiFi" wireless Ethernet (e.g., using low-power WiFi chipsets), Z-Wave, Zigbee, Bluetooth, "Home-plug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the monitoring system control unit 410, the one or more user devices 440, 450, and the central alarm station server 470 over the network 405. For example, the monitoring application server 460 may be configured to monitor events (e.g., alarm events) generated by the monitoring system control unit 410. In this example, the monitoring application server 460 may exchange electronic communications with the network module 414 included in the monitoring system control unit 410 to receive information regarding events (e.g., alarm events) detected by the monitoring system control unit 410. The monitoring application server 460 also may receive information regarding events (e.g., alarm events) from the one or more user devices 440, 450.

In some examples, the monitoring application server 460 may route alarm data received from the network module 414 or the one or more user devices 440, 450 to the central alarm station server 470. For example, the monitoring application server 260 may transmit the alarm data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the monitoring system control unit 410 or the one or more user devices 440, 450.

The central alarm station server 470 is an electronic device configured to provide alarm monitoring service by exchanging communications with the monitoring system control unit 410, the one or more mobile devices 440, 450, and the monitoring application server 460 over the network 405. For example, the central alarm station server 470 may be configured to monitor alarm events generated by the monitoring system control unit 410. In this example, the central alarm station server 470 may exchange communications with the network module 414 included in the monitoring system control unit 410 to receive information regarding alarm events detected by the monitoring system control unit 410. The central alarm station server 470 also may receive information regarding alarm events from the one or more mobile devices 440, 450 and/or the monitoring application server 460.

The central alarm station server 470 is connected to multiple terminals 472 and 474. The terminals 472 and 474 may be used by operators to process alarm events. For example, the central alarm station server 470 may route alarm data to the terminals 472 and 474 to enable an operator to process the alarm data. The terminals 472 and 474 may include general-purpose computers (e.g., desktop personal computers, workstations, or laptop computers) that are configured to receive alarm data from a server in the central alarm station server 470 and render a display of information based on the alarm data. For instance, the controller 412 may control the network module 414 to transmit, to the central alarm station server 470, alarm data indicating that a sensor 420 detected a door opening when the monitoring system was armed. The central alarm station server 470 may receive the alarm data and route the alarm data to the terminal 472 for processing by an operator associated with the terminal 472. The terminal 472 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the monitoring system control unit 410 over the network 405. The user device 450 may be configured to display a surveillance monitoring user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various local wireless protocols such as wifi, Bluetooth, zwave, zigbee, HomePlug (ethernet over powerline), or wired protocols such as Ethernet and USB, to connect the one or more user devices 440, 450 to local security and automation equipment. The one or more user devices 440, 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 460 may relay data received from the monitoring system control unit 410 to the one or more user devices 440, 450 through the network 405. In this regard, the monitoring application server 460 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 460 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 410, the one or more user devices 440, 450 use communication through the monitoring application server 460.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In some implementations, the one or more user devices 440, 450 are used in conjunction with only local sensors and/or local devices in a house. In these implementations, the system 400 only includes the one or more user devices 440, 450, the sensors 420, the module 422, the camera 430, and the robotic devices 480 and 482. The one or more user devices 440, 450 receive data directly from the sensors 420, the module 422, the camera 430, and the robotic devices 480 and 482 and sends data directly to the sensors 420, the module 422, the camera 430, and the robotic devices 480 and 482. The one or more user devices 440, 450 provide the appropriate interfaces/processing to provide visual surveillance and reporting.

In other implementations, the system 400 further includes network 405 and the sensors 420, the module 422, the camera 430, and the robotic devices 480 and 482 are configured to communicate sensor and image data to the one or more user devices 440, 450 over network 405 (e.g., the Internet, cellular network, etc.). In yet another implementation, the sensors 420, the module 422, the camera 430, and the robotic devices 480 and 482 (or a component, such as a bridge/router) are intelligent enough to change the communication pathway from a direct local pathway when the one or more user devices 440, 450 are in close physical proximity to the sensors 420, the module 422, the camera 430, and the robotic devices 480 and 482 to a pathway over network 405 when the one or more user devices 440, 450 are farther from the sensors 420, the module 422, the camera 430, and the robotic devices 480 and 482. In some examples, the system leverages GPS information from the one or more user devices 440, 450 to determine whether the one or more user devices 440, 450 are close enough to the sensors 420, the module 422, the camera 430, and the robotic devices 480 and 482 to use the direct local pathway or whether the one or more user devices 440, 450 are far enough from the sensors 420, the module 422, the camera 430, and the robotic devices 480 and 482 that the pathway over network 405 is required. In other examples, the system leverages status communications (e.g., pinging) between the one or more user devices 440, 450 and the sensors 420, the module 422, the camera 430, and the robotic devices 480 and 482 to determine whether communication using the direct local pathway is possible. If communication using the direct local pathway is possible, the one or more user devices 440, 450 communicate with the sensors 420, the module 422, the camera 430, and the robotic devices 480 and 482 using the direct local pathway. If communication using the direct local pathway is not possible, the one or more user devices 440, 450 communicate with the sensors 420, the module 422, the camera 430, and the robotic devices 480 and 482 using the pathway over network 405.

In some implementations, the system 400 provides end users with access to images captured by the camera 430 to aid in decision making. The system 400 may transmit the images captured by the camera 430 over a wireless WAN network to the user devices 440, 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "Away" state, but set not to capture images when the alarm system is armed in a "Stay" state or disarmed. In addition, the camera 430 may be triggered to begin capturing images when the alarm system detects an event, such as an alarm event, a door opening event for a door that leads to an area within a field of view of the camera 430, or motion in the area within the field of view of the camera 430. In other implementations, the camera 430 may capture images continuously, but the captured images may be stored or transmitted over a network when needed.

Further, in some implementations, the system 400 intelligently leverages the robotic devices 480 and 482 to aid in security monitoring, property automation, and property management. For example, the robotic devices 480 and 482 may aid in investigating alarm events detected at the property by the monitoring system control unit 410. In this example, the monitoring system control unit 410 may detect an alarm event (e.g., a fire alarm, an entry into the property when the system is armed "Stay," etc.) and, based on the detected alarm event, control the robotic devices 480 and 482 to attempt to identify persons in the property at the time of the alarm event. Specifically, the monitoring system control unit 410 may send a control command to each of the robotic devices 480 and 482 that causes the robotic devices 480 and 482 to perform a coordinated and automated search for persons in the property. Based on the control command received, each of the robotic devices 480 and 482 begins navigating the property and captures images of the property while navigating. Each of the robotic devices 480 and 482 may execute a predefined navigation pattern within the property or the robotic devices 480 and 482 may execute a coordinated scan of the property in which the robotic devices 480 and 482 exchange location information and navigate to areas that have not been explored by one of the other devices.

In some examples, the robotic devices 480 and 482 may analyze the images captured during the scan of the property for the presence of persons in the captured images. For instance, the robotic devices 480 and 482 may use image processing techniques in an attempt to identify shapes in the captured images that resemble a human body. The robotic devices 480 and 482 also may analyze the images for moving objects (or use other techniques to identify moving objects) and target imaging on capture of moving objects.

Based on detection of a human or a moving object, the robotic devices 480 and 482 may lock onto the human or moving object and follow the human or moving object throughout the property. In this regard, the robotic devices 480 and 482 may follow the human or moving object throughout the property and capture images of the movement. In addition, once one of the robotic devices 480 and 482 locks onto a human or moving object, the robotic devices 480 and 482 coordinate to ensure that multiple of the robotic devices 480 and 482 do not lock onto the same human or moving object. The coordination may be direct amongst the robotic devices 480 and 482 and/or through the monitoring system control unit 410. The coordination may involve sharing the location of the human or moving object and/or attributes of the human or moving object being imaged. Based on the shared location and attributes, the robotic devices 480 and 482 may determine whether multiple robotic devices 480 and 482 have locked onto the same object and take action accordingly. If the robotic devices 480 and 482 determine that the robotic devices 480 and 482 have not locked onto the same object, the appropriate one of the robotic devices 480 and 482 continues to lock onto the object while the other robotic devices scan other areas of the property for other objects. If the robotic devices 480 and 482 determine that the robotic devices 480 and 482 have locked onto the same object, the robotic devices 480 and 482 negotiate to determine which of the robotic devices 480 and 482 will continue to lock onto the object while the other robotic devices stop locking onto the object and scan other areas of the property for other objects. The negotiation may select the robotic device that continues tracking the object based on one or more factors including the timing of when the devices locked onto the object (e.g., which device locked onto the object first), the positioning of the devices relative to the object (e.g., which is best positioned to image the object), the amount of battery power remaining (e.g., the device with the most battery power remaining), or any other factor that indicates the device most suited to track the object. To the extent the device tracking an object becomes less suitable for tracking the object (e.g., the battery power is running low), the robotic devices 480 and 482 may coordinate to hand off tracking of the object to another one of the robotic devices 480 and 482.

In some examples, the robotic devices 480 and 482 perform image recognition processing on the one or more images in an attempt to detect whether any identified humans are legitimate users of the property or intruders. In these examples, the robotic devices 480 and 482 may have access to images of legitimate users of the property and may compare images being captured to the accessed images of legitimate users. Based on the comparison, the robotic devices 480 and 482 use facial recognition techniques to determine whether the imaged user matches a legitimate user of the property or an intruder. The robotic devices 480 and 482 then use the determination of whether the imaged user matches a legitimate user of the property or an intruder to control further tracking operation.

For example, based on a determination that the imaged user is an intruder, the robotic devices 480 and 482 may continue tracking the intruder and ensure that images sufficient to identify the intruder have been captured. In this example, the robotic devices 480 and 482 may attempt to capture biometric data from the intruder, such as voiceprint data, fingerprint data, and/or biological samples with DNA of the intruder. In addition, the robotic devices 480 and 482 may take action to thwart the purpose of the intruder. For example, the robotic devices 480 and 482 may fly in random patterns around the intruder, may play loud sounds near the intruder, may shine lights near the intruder, may output identifying information collected about the intruder (e.g., male, around six feet tall and one hundred eighty pounds), may enable a central station operator or first responder to talk to the intruder through a two-way voice communication session established through the monitoring system control unit 410 and the robotic device, and may take other actions directed to disrupting the intruder.

Alternatively, based on a determination that the imaged user is a legitimate user, the robotic devices 480 and 482 may discontinue tracking the legitimate user and scan for intruders. The robotic devices 280 and 482 also may report the location of the legitimate user. The robotic devices 480 and 482 further may continue tracking the legitimate user and attempt to provide assistance to the user. For instance, if the alarm is a fire alarm event, the robotic devices 480 and 482 may stay near the legitimate user, continuously or periodically update the location of the legitimate user to assist another user or first responder in helping the legitimate user, provide audible reminders of what types of actions should be taken in a fire, enable a central station operator or first responder to talk to the legitimate user through a two-way voice communication session established through the monitoring system control unit 410 and the robotic device, and may take other actions directed to assisting the legitimate user.

In some examples, the robotic devices 480 and 482 may be assigned to different areas of the property where the robotic devices 480 and 482 can move in an unobstructed manner. In these examples, the robotic devices 480 and 482 may be assigned to different levels in a property (e.g., an upstairs robotic device and a downstairs robotic device) and even different rooms or sections that are potentially blocked by doors. The monitoring system control unit 410 coordinate tracking movement based on the assigned areas. For instance, the monitoring system control unit 410 determines areas in a property where an event has been detected (e.g., where motion is sensed, where a door or window is opened, etc.) and only controls the robotic devices assigned to the determined areas to operate. In this regard, the monitoring system control unit 410 may use location of users determined using sensors to control operation of the robotic devices 480 and 482.

In addition, the robotic devices 480 and 482 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 410 may open a door to enable an exterior robotic device to leave and return to the property. For instance, an exterior device may have a base or reference location in a garage of the property and the monitoring system control unit 410 may automatically open a garage door to allow the exterior device to leave the garage and explore the exterior of the property.

In some implementations, the monitoring system control unit 410 may monitor operational status of the robotic devices 480 and 482 and coordinate further operation based on the operational status. In these implementations, the monitoring system control unit 410 may detect that a particular robotic device is no longer operational and control one or more other robotic devices to perform operations originally assigned to the non-operational robotic device. In addition, the monitoring system control unit 410 may determine that the non-operational robotic device was navigating close to an intruder and received an impact based on accelerometer data prior to becoming non-operational. In this case, the monitoring system control unit 410 may infer that the robotic device was smashed by the intruder and control other robotic devices based on the inference. For instance, after inferring a smash event, the monitoring system control unit 410 may control operation of other robotic devices to maintain distance from the intruder by only flying high overhead.

In some implementations, the monitoring system control unit 410 may determine battery power available for each of the robotic devices 480 and 482 and coordinate operation of the robotic devices 480 and 482 based on available battery power. In these implementations, the robotic devices 480 and 482 may report battery power remaining to the monitoring system control unit 410 and the monitoring system control unit 410 may determine a subset of the robotic devices 480 and 482 to deploy based on the battery power information. For instance, the monitoring system control unit 410 may select to initially deploy the robotic device with the most available battery power to allow the other robotic devices to charge while the selected device assists with monitoring. Once the battery power for the selected device falls below a threshold, the monitoring system control unit 410 may return the selected device to a charging station and select the robotic device with the presently highest available battery power to resume the monitoring options being performed. The monitoring system control unit 410 may cycle through all of the robotic devices 480 and 482 in an intelligent manner that best leverages the battery power available. If the battery power of a device becomes too low to effectively operate as a navigating device, the monitoring system control unit 410 may control the robotic device to remain stationary and act as a stationary camera or other sensor to still assist with monitoring, although the added benefit of navigation no longer exists.

In addition to battery, the monitoring system control unit 410 may select the robotic device to deploy and what action to take based on the sensor that triggered the event, a time of day, and a state of the system. For instance, if the monitoring system control unit 410 detects an unusual motion sensor event, the monitoring system control unit 410 may select the nearest robotic device to navigate to an area of the property where motion was detected and investigate. Alternatively, if the monitoring system control unit 410 detects a critical alarm event (e.g., a security breach of a system armed stay, a fire alarm, a carbon monoxide alarm, etc.), the monitoring system control unit 410 may deploy all robotic devices 480 and 482 at any time of the day. If the monitoring system control unit 410 detects an intrusion breach, the monitoring system control unit 410 may assign some devices to "attack" the intruder by disrupting the purpose of the intruder and collecting identifying information for the intruder and assign some devices to search for other users in the property. The selected devices and actions taken may vary based on sensor data, time of day, and the state of the monitoring system.

In some implementations, the system 400 allows central station operators, first responders, and/or users of the property to interact with and control the robotic devices 480 and 482. In these implementations, a central station operator, first responder, or user of the property may provide input to control the robotic devices 480 and 482 in a manner that best assists with monitoring and investigation of detected events. For instance, the central station operator, first responder, or user of the property may remotely control navigation of the robotic devices 480 and 482. The central station operator, first responder, or user of the property also may provide general commands related to actions the robotic devices 480 and 482 are designed to take. In response to these general commands, the robotic devices 480 and 482 may automatically perform the desired actions, such as following an instruction to explore the property or following an instruction to navigate to an upstairs bedroom.

In some examples, the robotic devices 480 and 482 may periodically perform test sequences to ensure the robotic devices 480 and 482 will operate correctly if needed. In these examples, the robotic devices 480 and 482 may periodically navigate predefined navigation patterns used to investigate the property and/or may navigate around the property in a scanning sequence. The robotic devices 480 and 482 may determine whether the test sequences perform correctly or whether an error occurs that prevents full investigation of the property. To the extent an error occurs, the robotic devices 480 and 482 report the error and enable a user of the property or a technician to correct the error prior to a time when the robotic devices 480 and 482 would be needed for safety monitoring.

The monitoring system control unit 410 also may arrange the test sequences to occur during periods of time that are convenient for users of the property. For example, the monitoring system control unit 410 may assess sensor data at the property and determine a time period in which the property is unoccupied and unlikely to be occupied until the test sequences complete. In this example, the monitoring system control unit 410 waits until the preferred time period to initiate test sequences for one or more of the robotic devices 480 and 482.

In some examples, the robotic devices 480 and 482 may be used to provide a critical alert to a user in the property or attempt to wake a sleeping person as appropriate. In these examples, none of the users may be responding to a critical alert and, in response, the monitoring system control unit 410 may control the robotic devices 480 and 482 to search for a person in the property and provide the critical alert very close to an identified person in a manner that is highly likely to gain the person's attention to the critical alert. In the event that the person appears to be sleeping in the property, the robotic devices 480 and 482 may attempt to wake the person by providing loud input very near the person and/or by making contact with the person. In this regard, the robotic devices 480 and 482 may be useful in waking a sleeping person when a fire or carbon monoxide alarm has been detected and the person needs to leave the property. The robotic devices 480 and 482 also may determine when a person is nonresponsive (e.g., unconscious) and may be need of immediate assistance. Also, the robotic devices 480 and 482 may serve as an alarm clock for critical meetings based on a person having trouble waking up using traditional alarm clocks.

In some implementations, the robotic devices 480 and 482 may operate as mobile sensors that move throughout the property. In some examples, the robotic devices 480 and 482 may have humidity sensors, air flow sensors, temperature sensors, or the like. In these examples, the robotic devices 480 and 482 may periodically navigate throughout the property and take temperature, humidity, and air flow measurements at various locations throughout the property. The system 400 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

Figure 5:
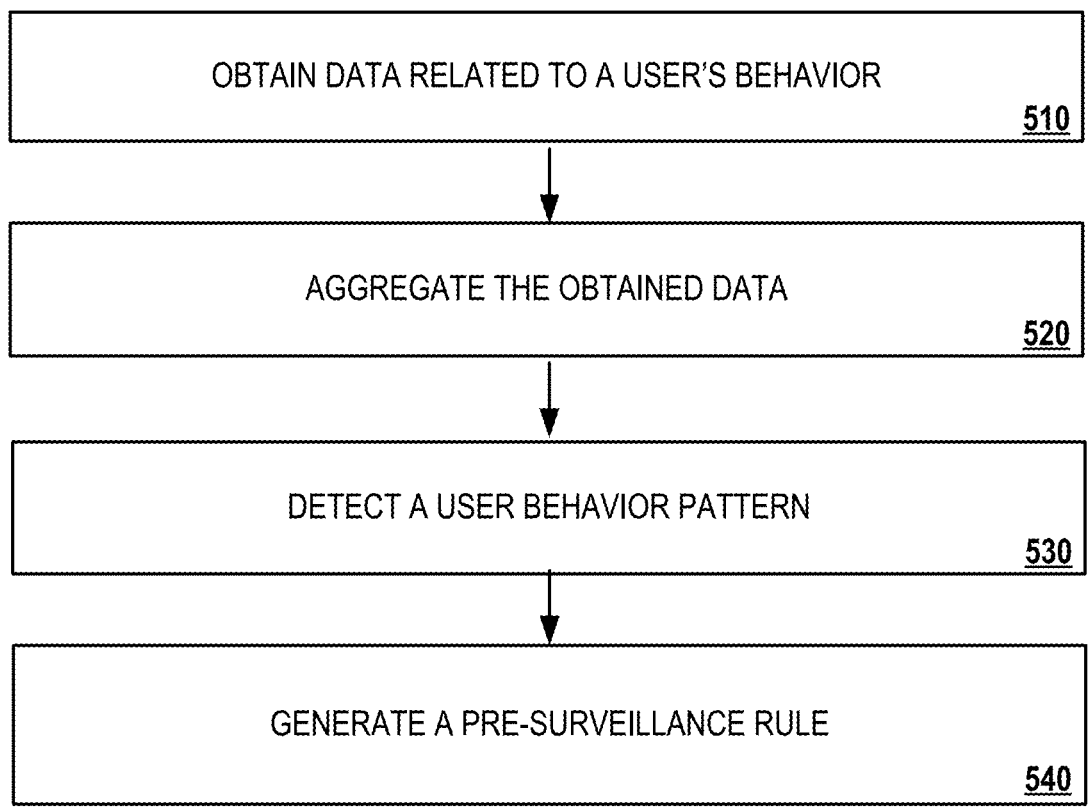
FIG. 5 is a flowchart of an example of a process for tracking user behavior pattern.

FIG. 5 is a flowchart of an example of a process 500 for tracking user behavior patterns. In general, the process 500 may include obtaining data related to a user's behavior (510), aggregating the obtained data based on a predetermined time period (520), detecting a user behavior pattern (530), and generating a pre-surveillance rule (540).

In more detail, the process may begin with a monitoring system using a monitoring system control unit, or other computer, to obtain data related to user's behavior at stage 510. Data related to a user's behavior may be obtained from one or more sensors. For instance, a property may include one or more sensors such as motion sensors, door open sensors, door close sensors, or a combination therefore. As a user moves through the property, the sensors may detect the user's movement, and transmit data related to the user's movement to a monitoring system control unit. Alternatively, or in addition, data related to a user's behavior may be obtained from one or more user devices used by the user. For instance, the monitoring system control unit may obtain data from the user's smartphone (or other handheld device), the user's smartwatch (or other wearable device), or the like. In some implementations, the user's user device may periodically transmit the user's location to the monitoring system control unit. Alternatively, or in addition, the data related to a user's behavior may be obtained by one or more sensors mounted to one or more drones that can move freely around the inside of a property, outside of a property, long range distances away from the property, or a combination thereof. For instance, a drone may be configured to follow within a predetermined distance of a user, and use one or more drone sensors to obtain data related to the user's behavior and transmit obtained data to the monitoring system control unit. Once received, the monitoring system control unit can use this data to identify one or more user behavior patterns, one or more drone navigational patters, or the like.

At stage 520, the monitoring system may use a monitoring system control unit, or other computer, to aggregate the obtained data. In some implementations, the obtained data may be aggregated over a predetermined period of time. For example, the monitoring system control unit may aggregate all data obtained for a particular user over the course of the last week, last two weeks, last month, or the like.

At stage 530, the monitoring system use a monitoring system control unit, or other computer, to detect a user behavior pattern. Detecting a user behavior pattern may include identifying similar actions performed by the user at the same time of particular days of a week. Such patterns may include, for example, a user leaving the house every weekday at 7:00 am. The system may make that determination because, for example, sensor data obtained over the last month indicates that the user consistently leaves the user's property every weekday at 7:00 am. Other examples of user behavior patterns include kids going outside to play in the yard at 12:00 pm on the weekends, a user leaving work at 5:00 pm on weekdays, a family leaving their house at 10:30 am on Sunday's to go to church, a user walking a dog every night at 8:45 pm, or the like.

The stage of detecting a user's behavior also includes the monitoring system's ability to analyze data within a range of time periods, eliminate data that is a statistical outlier, and the like. For example, the monitoring system control unit may cluster data obtained from a sensor at the user's front door. The clustered data for a two week period of time may indicate that with the exception of one day in that two week span where the user left the house at 10:00 am, the user left the property within the time period of 6:53 am and 7:04 am. Accordingly, the monitoring system control unit may determine that user's behavioral pattern is leaving the house every day between 6:53 and 7:04 pm. The monitoring system control unit may disregard the statistical outlier time of 10:00 am because the user's behavioral history indicates that the user leaving late one day at 10:00 am is not related to the user's pattern of regularly leaving within the time range of 6:53 am to 7:04 pm.

At stage 540, the monitoring system control unit may generate a pre-surveillance rule. The pre-surveillance rule may include (i) a trigger time (e.g., 6:55 am) that is a predetermined amount of time before the user's 102 behavioral pattern begins (e.g., 7:00 am). In some implementations, a user's behavioral pattern may be associated with a range of times as opposed to a particular time. In such instances, the trigger time may be selected as a time that is a predetermined time before the earliest time in the range of times associated with the user's behavioral pattern. The pre-surveillance rule may also include a location that is to be pre-surveilled. The location to be pre-surveilled may be the location associated with the user's behavioral pattern. The location may include, for example, a downstairs portion of a property, an upstairs portion of a property, a parking lot, a driveway, a neighborhood, or the like. The pre-surveillance rule may also include an initial predetermined navigational path. The initial predetermined navigational path may include an initial navigational path that a drone is supposed to travel in response to receiving a pre-surveillance instruction. The initial navigational path is used to provide structured guidance to the drone during pre-surveillance activities.

However, the drone is capable of veering from the initial navigational path if a potential threat to the safeness of the location being pre-surveilled is detected so that the drone can fully investigate the potential threat to the safeness of the location. In some implementations, a user of a user device may be provided the option to take control of the drone once a potential threat to safeness has been identified. In such instances, the user may manually fly the drone using, for example, an application on the user's device. Once the potential threat to safeness is investigated further, the user may transmit an instruction to the drone to return to autonomous navigation based on the initial navigational path.

Figure 6:
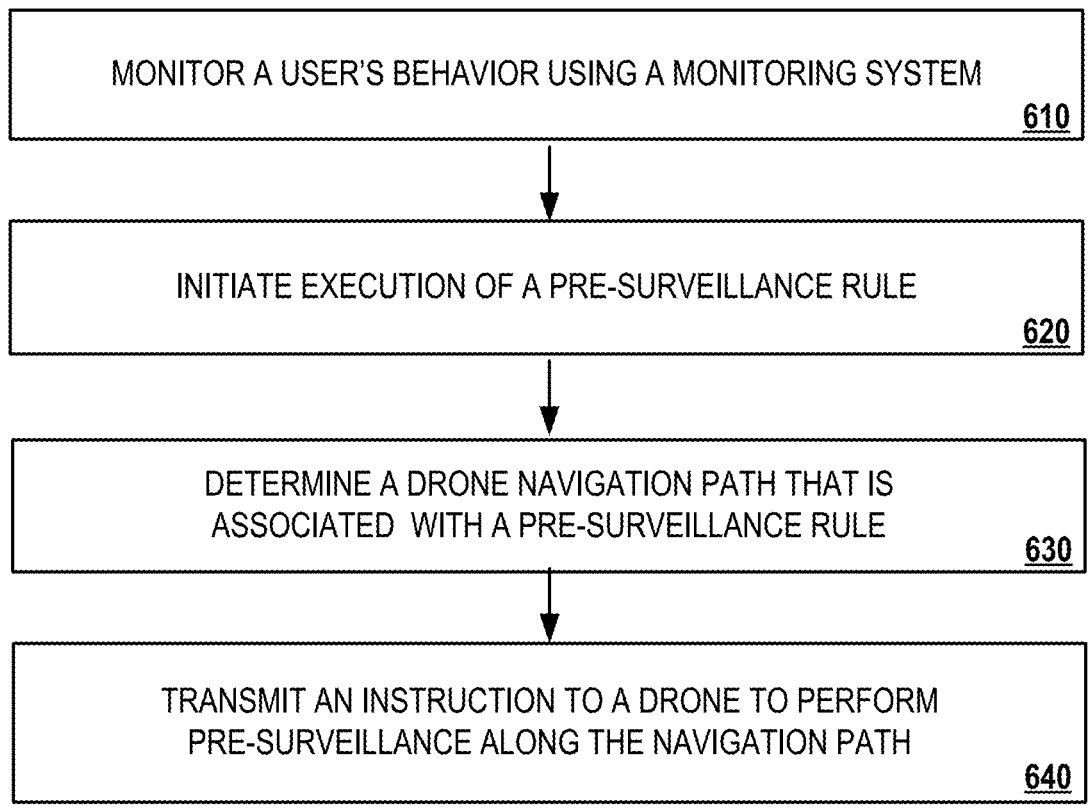
FIG. 6 is a flowchart of a process for performing drone pre-surveillance based on a detected user behavior pattern.

FIG. 6 is a flowchart of a process 600 for performing drone pre-surveillance based on a detected user behavior pattern. In general, the process 600 may include monitoring a user's behavior using a monitoring system (610), determining whether to initiate execution of a pre-surveillance rule (620), determining a drone navigation path that is associated with a pre-surveillance rule (630), and transmitting an instruction to a drone to perform pre-surveillance along the navigation path (640).

In more detail, the process 600 may begin at stage 610 by monitoring a user's behavior using a monitoring system. Monitoring the user's behavior may include obtaining data obtained related to the user's behavior from one or more sensors, one or more user devices, one or more drones, or the like. The obtained data may then be analyzed to determine if the data is consistent with user behavioral patterns associated with one or more pre-surveillance rules.

The process 600 may continue at stage 620 by determining whether to initiate execution of a pre-surveillance rule. The determination of whether to initiate execution of a pre-surveillance rule may be based on the data collected by the monitoring system at stage 610. For example, determining whether to initiate execution of a pre-surveillance rule may include applying the collected user data, sensor data, or a combination thereof, to a pre-surveillance rule that identifies an area of one or more properties for pre-surveillance based on a likely action of the occupant of the property. Execution of the pre-surveillance rule may be initiated and deployment of the drone triggered at the trigger time associated with the pre-surveillance rule if, for example, the applied user data, sensor data, or both, and a time associated with the applied user data, sensor data, or both, satisfies the constraints of the pre-surveillance rule.

By way of example, if the data obtained by the monitoring system is consistent with a user's behavior pattern associated with a pre-surveillance rule, the monitoring system control unit may initiate execution of the pre-surveillance rule at the trigger time associated with the pre-surveillance rule. For example, a pre-surveillance rule may be (i) associated with the user behavioral pattern of leaving a property at 7:00 am on a weekday to go to work, and (ii) include a trigger time of 6:55 am. The monitoring system may determine that the user's behavioral pattern is consistent with the behavioral pattern associated with the pre-surveillance rule if one or more motion sensors throughout the house show the user moving from room to room getting ready for work between the times of, for example, 6:00 am to 6:54 am, or the like. Accordingly, in such instances, at 6:55 am the system may determine to initiate execution of the pre-surveillance rule.

On the other hand, however, for example, a pre-surveillance rule may be (i) associated with the user behavioral pattern of leaving a property at 7:00 am on a weekday to go to work, and (ii) include a trigger time of 6:55 am. However, if the monitoring system determines that the user still has not gotten out of bed at 6:54 am (e.g., because one or more motion sensors in the user's bedroom, or any other portion of the house, are not detecting movement), then the monitoring system may determine to not initiate execution of the pre-surveillance rule at 6:55 am. Such an option may be employed to save wear and tear on the drone device by preventing the drone device from performing unnecessary pre-surveillance activities.

In yet other implementations, however, the monitoring system may initiate execution of a pre-surveillance rule at the designated trigger time regardless of the current state of the user. However, over time, in some implementations, if the monitoring system fails to identify a user regularly performing a particular behavioral pattern associated with a particular pre-surveillance rule (e.g., the user stops performing the behavioral pattern, the user's habits change, or the like), the monitoring system may delete the generated pre-surveillance rule because it is no longer associated with a regular behavioral pattern of the user.

The process 600 may continue at stage 630 by determining a drone navigation path. In some implementations, a drone navigation path may be selected based on the area of the property associated with the pre-surveillance rule. The drone navigation path may include a predetermined navigation path that was pre-programmed into the drone. In some implementations, the navigation path may be selected independent of user behavioral data collected by the monitoring system. For instance, a predefined navigational path may include a drone traveling out the door of a property, window of a property, garage door of the property or the like that was opened in response to an instruction from the monitoring system control unit. The door of a property, window of a property, garage door of a property may be connected to the monitoring system, be automated, and respond to open/close instructions from the monitoring control unit. Once it has exited the property, the drone may then fly in a circle around a car in the driveway of the property independent of a user's path to the car. Alternatively, the predefined navigational path may be based on user behavioral data collected by the monitoring system. For instance, the monitoring system may obtain information regarding a path traveled by a user such as a dog walk path. Then, for example, the information specifying the path of the user may be associated be associated with the dog walk pre-surveillance rule, and used as the initial predetermined navigational path for the drone.

The process 600 may continue at stage 640 by transmitting data that includes an instruction to a drone to perform pre-surveillance along an initial navigation path. The instruction may include sufficient instructions to trigger the deployment of the drone that receives the transmitted data.

FIG. 7 is a flowchart of a process 700 for performing drone pre-surveillance. The process 700 may include receiving an instruction to perform pre-surveillance (710), travelling along a predetermined navigation path (720), obtaining data associated with the environment within a predetermined distance of the navigation path (730), and generating a report that indicates a level of safeness of the environment within a predetermined distance of the navigation path (740).

The process 700 may begin at stage 710 with a drone receiving an instruction to perform pre-surveillance. In response to the receipt of the instruction to perform pre-surveillance, the drone may begin travelling at stage 720 along an initial predetermined navigation path.

While on traveling along the initial predetermined navigational path, the drone may being obtaining data associated with the environment within a predetermined distance of the navigation path at stage 730. The obtained data may include one or more videos, still images, or the like that were taken of the environment during the pre-surveillance flight. The still images may include facial recognition scans of a person present in the environment. Alternatively, the obtained data may be indicative of sensor data that is collected by one or more drone sensors.

The process may continue at stage 740 by determining a level of safeness associated with the environment based on the obtained data. The level of safeness may be determined based on a variety of factors. For example, a level of safeness may be determined based on a number of pre-defined safety risks. In one implementation, the level of safeness may be impacted based on whether one or more individuals are loitering in the property being pre-surveilled. Alternatively, or in addition, the level of safeness may be further impacted based on whether the loitering individuals are armed with one or more weapons. The drone may determine if the loitering individual is armed with one or more weapons by taking pictures of the loitering individual's hands, and searching one or more image databases to determine whether the captured image includes a weapon. Alternatively, or in addition, the drone may analyze the loitering individuals clothing to identify bulges that may be associated with a concealed weapon. Alternatively, or in addition, the level of safeness may be impacted based on the drone determining that the loitering individual is dressed suspiciously. A loitering individual may be dressed suspiciously, for example, if the loitering individual is wearing a mask. Alternatively, or in addition, the drone may perform facial recognition analysis to determine whether the loitering individual is associated with a record in one or more of a local law enforcement databases, a federal law enforcement databases, a sex offender database, or the like. For example, the drone may be able to determine if there is an issued warrant out for the loitering individual's arrest, whether the loitering individual has a criminal record, or the like. The existence of one or more of the aforementioned safety risk factors may result in an environment being determined to be less safe.

If none of the aforementioned safety risks are identified, then a pre-surveilled region may be determined to be safe. On the other hand, if the drone identifies multiple safety risks, then a pre-surveilled region may be determined to be unsafe. In a similar manner, a pre-surveilled region may be determined to be moderately safe if the drone merely finds a loitering individual without identifying any other safety risks, or other minor safety issues.

The process 700 may continue at stage 740 with the drone generating a report that indicates a level of safeness of the environment within a predetermined distance of the navigation path. In some implementations, the report includes data that provides a notification to the user's user device indicating whether the environment is safe, unsafe, unknown, or the like. Alternatively, or in addition, the level of safeness may be indicated as a probability that indicates the likelihood that the environment is safe.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A method comprising:
predicting, by a monitoring system configured to monitor a property, an action to be performed by a user associated with the property;
determining, by the monitoring system, a time point during which the user is predicted to perform the action;
determining, by the monitoring system, a location within the property where the user is predicted to perform the action; and
providing, by the monitoring system, an instruction to a drone that, when received by the drone, causes the drone to perform one or more surveillance operations at the location before the time point.

2. The method of claim 1, further comprising:
obtaining, by the monitoring system, data indicating a set of reoccurring actions previously performed by the user; and
wherein the action to be performed by the user is predicted based on the set of reoccurring actions previously performed by the user.

3. The method of claim 1, wherein:
the method further comprises generating a pre-surveillance rule for monitoring the property based on the action that is predicted to be performed by the user; and the pre-surveillance rule specifies (i) one or more satisfaction criteria associated with predicting that the user will perform the action, and (ii) one or more execution criteria for the one or more surveillance operations.

4. The method of claim 1, further comprising:
obtaining, by the monitoring system, sensor data collected by one or more sensors located in the property; and
wherein the action to be performed by the user is predicted based on the sensor data collected by the one or more sensors.

5. The method of claim 4, wherein the one or more sensors comprises a motion sensor, a contact sensor, and a temperature sensor.

6. The method of claim 1, wherein the one or more surveillance operations comprises a surveillance operation to determine a safety level associated with the location within the property where the user is predicted to perform the action.

7. The method of claim 1, wherein:
the action predicted to be performed by the user comprises the user to leaving the property through an exit; and
the one or more surveillance operations comprises a surveillance operation to determine a safety level associated with the user leaving the property through the exit.

8. A system comprising:
one or more computing devices; and
one or more storage devices storing instructions that, when executed by the one or more computing devices, cause the one or more computing devices to perform operations comprising:
predicting, by a monitoring system configured to monitor a property, an action to be performed by a user associated with the property;
determining, by the monitoring system, a time point during which the user is predicted to perform the action;
determining, by the monitoring system, a location within the property where the user is predicted to perform the action; and
providing, by the monitoring system, an instruction to a drone that, when received by the drone, causes the drone to perform one or more surveillance operations at the location before the time point.

9. The system of claim 8, wherein the operations further comprise:
obtaining, by the monitoring system, data indicating a set of reoccurring actions previously performed by the user; and
wherein the action to be performed by the user is predicted based on the set of reoccurring actions previously performed by the user.

10. The system of claim 8, wherein:
the operations further comprise generating a pre-surveillance rule for monitoring the property based on the action that is predicted to be performed by the user; and
the pre-surveillance rule specifies (i) one or more satisfaction criteria associated with predicting that the user will perform the action, and (ii) one or more execution criteria for the one or more surveillance operations.

11. The system of claim 8, wherein the operations further comprise:
obtaining, by the monitoring system, sensor data collected by one or more sensors located in the property; and
wherein the action to be performed by the user is predicted based on the sensor data collected by the one or more sensors.

12. The system of claim 11, wherein the one or more sensors comprises a motion sensor, a contact sensor, and a temperature sensor.

13. The system of claim 8, wherein the one or more surveillance operations comprises a surveillance operation to determine a safety level associated with the location within the property where the user is predicted to perform the action.

14. The system of claim 8, wherein:
the action predicted to be performed by the user comprises the user to leaving the property through an exit; and
the one or more surveillance operations comprises a surveillance operation to determine a safety level associated with the user leaving the property through the exit.

15. At least one non-transitory computer-readable storage device storing instructions that, when executed by one or more processors, causes the one or more processors to perform operations comprising:
predicting, by a monitoring system configured to monitor a property, an action to be performed by a user associated with the property;
determining, by the monitoring system, a time point during which the user is predicted to perform the action;
determining, by the monitoring system, a location within the property where the user is predicted to perform the action; and
providing, by the monitoring system, an instruction to a drone that, when received by the drone, causes the drone to perform one or more surveillance operations at the location before the time point.

16. The system of claim 15, wherein the operations further comprise:
obtaining, by the monitoring system, data indicating a set of reoccurring actions previously performed by the user; and
wherein the action to be performed by the user is predicted based on the set of reoccurring actions previously performed by the user.

17. The non-transitory computer-readable storage device of claim 16, wherein:
the operations further comprise generating a pre-surveillance rule for monitoring the property based on the action that is predicted to be performed by the user; and
the pre-surveillance rule specifies (i) one or more satisfaction criteria associated with predicting that the user will perform the action, and (ii) one or more execution criteria for the one or more surveillance operations.

18. The non-transitory computer-readable storage device of claim 16, wherein the operations further comprise:
obtaining, by the monitoring system, sensor data collected by one or more sensors located in the property; and
wherein the action to be performed by the user is predicted based on the sensor data collected by the one or more sensors.

19. The non-transitory computer-readable storage device of claim 18, wherein the one or more sensors comprises a motion sensor, a contact sensor, and a temperature sensor.

20. The non-transitory computer-readable storage device of claim 15, wherein the one or more surveillance operations comprises a surveillance operation to determine a safety level associated with the location within the property where the user is predicted to perform the action.

\* \* \* \* \*